Aug. 29, 1967   K. G. KREUTER ETAL   3,338,519
ZONE LOAD RESPONSIVE OPTIMIZING CONTROL SYSTEM
Filed July 16, 1964   2 Sheets-Sheet 1

INVENTOR
Kenneth G. Kreuter
& James W. Phillips
BY Herbert M. Birch
ATTORNEYS

United States Patent Office 3,338,519
Patented Aug. 29, 1967

3,338,519
ZONE LOAD RESPONSIVE OPTIMIZING
CONTROL SYSTEM
Kenneth G. Kreuter, Goshen, and James W. Phillips, South Bend, Ind., assignors to Robertshaw Controls Company, Richmond, Va., a corporation of Delaware
Filed July 16, 1964, Ser. No. 383,130
8 Claims. (Cl. 237—8)

This invention relates to pnuematic environmental control means, and more particularly, to control means wherein the temperature of the heat exchange medium supplied to the various zones in a zone conditioning system is optimized as a function of the existing zone loads in the system.

The most commonplace method practical in the art, for resetting the discharge temperature of the controlled or heat exchange medium in an environmental control system, is to sense the outdoor temperature adjacent the environment, such as a building, being controlled and subsequently controlling the said discharge temperature as a direct function of this outdoor temperature.

Thus, if there are a number of rooms in a building, each controlled by its own thermostat system (room control loop), and there should happen to be a large number of people and/or conditions of sunshine in some of these rooms, the outdoor temperature function for the control zone comprising these rooms will result in an unnecessarily high discharge temperature of the heat exchange medium for the purpose of heating those rooms which do not demand maximum heating. By the same token, however, there may be rooms in the control zone which demand a high rate of heating such as, for example, rooms having conditions of shade and/or very few or no people therein.

The problem thus exists that with the above-defined method of control, there is a marked degree of inefficiency present from the standpoint of fuel consumption and wasted heat energy.

It is an object of this invention to provide a new and novel zone load optimizing control means for environmental control systems.

Another object of this invention is to provide a new and novel zone load optimizing control means for environmental control systems including a novel controller with selectively variable response delay means therein.

Still another object of this invention is to provide environmental control systems with optimized efficiency of operation.

These and other objects of this invention will become more fully apparent with reference to the following specification and drawings which relate to a preferred embodiment of the invention.

Figure 1:
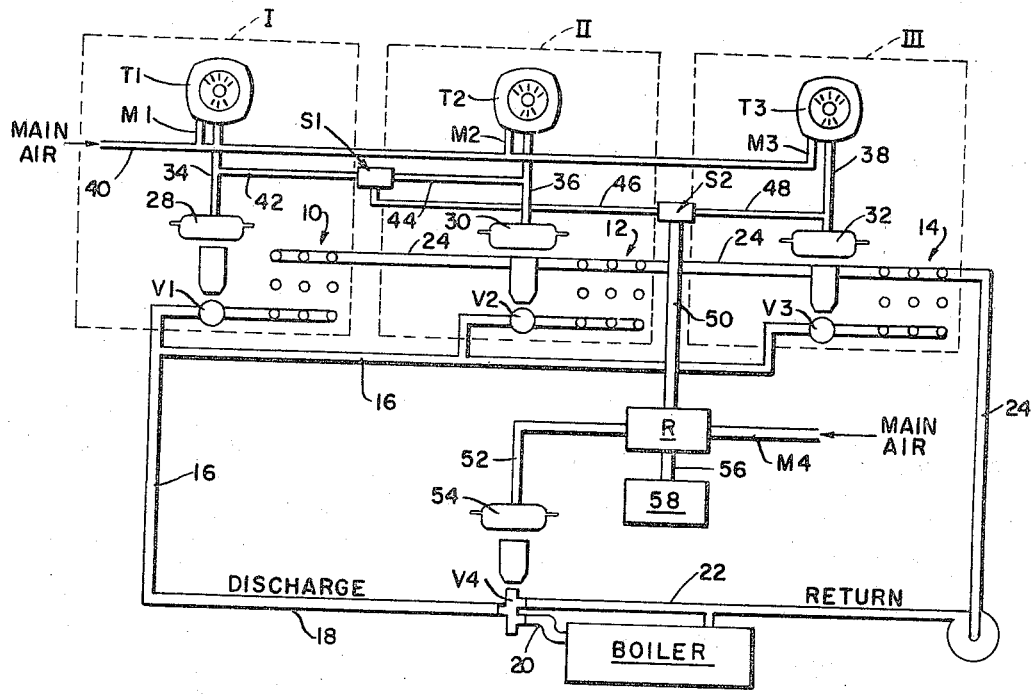
FIGURE 1 is a schematic of a zone load optimizing control system of the present invention.

Referring in detail to the drawings, and more particularly to FIGURE 1, the system of the present invention is shown as including a control zone comprising first, second and third rooms I, II and III, respectively, indicated in dotted lines which are to be heated, in the specific embodiment shown, by individual first, second and third heat exchangers 10, 12 and 14, respectively.

The heat exchangers 10, 12 and 14 are respectively connected via first, second and third flow control valves V1, V2 and V3 with a common feedline 16. The feed line 16 is directly connected with the discharge line 18 of a main mixing valve V4 which is connected at its input to a boiler output line 20 and to the bypass portion of a boiler return line 22.

The heat exchangers 10, 12 and 14 are mutually connected to a return branch 24 which is connected through a return pump 26 with the boiler return line 22.

The flow control valves V1, V2 and V3 are operated, respectively, by first, second and third conventional expansible chamber pneumatic motors 28, 30 and 32 which are supplied, respectively, through first, second and third branch pressure lines 34, 36 and 38 of first, second and third pneumatic room thermostats T1, T2 and T3, respectively, in the rooms I, II and III being controlled by the system.

The thermostats T1, T2 and T3 are commonly connected to a main pressure supply line 40 at their respective main pressure input connections M1, M2 and M3.

The branch pressure lines 34 and 36 of the first and second thermostats T1 and T2, respectively, are both connected via lines 42 and 44 to the two inputs of a first pressure selector S1.

The output of the first pressure selector S1 is connected through a line 46 to one input of a second pressure selector S2, which has its other input connected via a line 48 with the branch pressure line 38 of the third thermostat T3.

The output of the second pressure selector S2 is connected via a signal pressure line 50 with the input port of an automatic controller R, which will be hereinafter more fully described in connection with FIGURE 3.

The controller R has a main air pressure supply connection M4, a branch pressure output line 52 connected with the pneumatic motor 54 of the main control valve V4, and a stabilizing pressure output line 56 connected with an air accumulator or tank 58.

Figure 2:
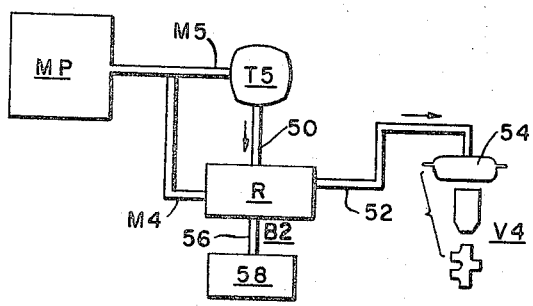
FIG. 2 is a schematic illustrating the response delay means of the present invention.

Referring to FIGURE 2, a simplified schematic of the interconnection of the automatic controller R with the various major component parts of the system of FIGURE 1 will now be described.

The main air pressure connections M4 and M5 of the controller R and a single thermostat T5, respectively, are shown as being connected with a common main air pressure supply MP.

The thermostat T5 is schematically the equivalent of the plurality of room thermostats T1, T2 and T3 and the pressure selectors S1 and S2 of FIGURE 1 and is shown with the signal pressure line 50 of FIGURE 1 as its branch pressure output.

The remaining connections of the controller R with the accumulator tank 58 and main control valve V4 are identical with those described above with reference to FIGURE 1.

The automatic controller R will now be described in detail with reference to FIGURE 3, wherein those pressure connections already described in FIGURES 1 and 2 bear identical numerals.

The controller R includes a base member 60, a first diaphragm D1 coextensive therewith, a first pressure plate 62 stacked on said first diaphragm, a second diaphragm D2 stacked on said first pressure plate coextensive with said base member 60, a second pressure plate 64 stacked on said second diaphragm, a third diaphragm D3 stacked on said second pressure plate coextensive with said base member 60, a third pressure plate 66 stacked on said third diaphragm, a fourth diaphragm D4 stacked on said third pressure plate coextensiive with said base member 60 and a cover member 68 stacked on said fourth diaphragm coextensive therewith.

All of the pressure plates 62, 64 and 66 are cut out at their centers leaving the diaphragms D1, D2, D3 and D4 separated from each other free to move at the central portions thereof. A stacked valve spindle structure 70 is interconnected with the said central portions of the said diaphragms and includes separating means in the form of stacked washers 72 or the like for maintaining the spacing between the said diaphragms.

The base member 60 includes a main pressure chamber P connected with the main pressure connection M4 which includes an integral valve seat 74 surrounding an inlet port 76 communicating with a branch pressure chamber B1. The branch pressure chamber B1 is defined by a cavity 78 in the base member 60 and one side of the first diaphragm D1.

A two-way relay poppet 80 is contained in the main pressure chamber P and includes a first valve head 82 which is biased against the first seat 74 by means of a compression spring 84.

A second valve head 86 on the poppet 80 extends through the inlet port 76 into the branch pressure chamber B1.

The valve spindle 70 includes a floating exhaust seat 88 which extends into the branch pressure chamber B1 below the first diaphragm D1 into immediate proxiimity with the second valve head 86 on the relay poppet 80 with which it is adapted to selectively engage, as will be hereinafter more fully described.

The exhaust seat 88 includes an internal exhaust port 90 which extends through the spindle 70 into an exhaust chamber E, defined by the second and third diaphragms D2 and D3 and the second pressure plate 64. The exhaust chamber E is connected with atmosphere via a vent port 92.

A signal pressure chamber S1 is defiined by the third and fourth diaphragms D3 and D4 and the third pressure plate 66.

A set point pressure chamber S2 is defined by the first and second diaphragms D1 and D2 and the first pressure plate 62.

A stabilizing pressure chamber B2 is defined on one side by the fourth diaphragm D4 and on the other by a cavity 94 in the cover member 68.

The signal pressure chamber S1 is connected with the signal pressure line 50 via a pressure port 96, the latter being extended to further connect with a signal pressure gauge G1.

The set point pressure chamber S2 is connected with the main pressure chamber P via a pressure port 98, flow restrictor 100, and pressure port 102, the latter being extended to further connect with a set point pressure gauge G2. The pressure port 102 is selectively vented to atmosphere through a set point pressure regulator valve 104 and vent port 106. The regulator valve 104 includes a selector knob or index means 108 whereby the set point pressure may be selectively varied.

The branch pressure chamber B1 is connected with the branch pressure line 52 via a pressure port 110 which is extended to further connect with a branch pressure gauge G3, the latter being adapted to be calibrated in terms of the degree of opening of the main control valve V4 which is a direct function of the magnitude of the branch pressure.

The stabilizing pressure chamber B2 is connected with the accumulator pressure line 56 via a pressure port 112. The pressure port 112 and thus, the stabilizing chamber B2, are interconnected with the pressure port 110 and hence, the branch pressure chamber B1, through a selectively variable needle valve 114. A selector knob or index means 116 is provided on the needle valve 114 whereby the flow rate therethrough may be selectively varied for a purpose to be hereinafter more fully described.

*Operation*

The preferred embodiment of the system of the present invention that is illustrated herein in FIGURE 1, is presented as a hot water heating system.

For the sake of concrete example, it will be assumed that the individual branch pressures derived from each of the thermostats T1, T2 and T3 of FIGURE 1, or the thermostat T5 of FIGURE 2, are inversely proportional to the temperature of the room or space being monitored thereby. Thus, a minimum branch pressure corresponds to a maximum demand for heat.

Further, it will be assumed that the pressure selectors S1 and S2 of FIGURE 1 are minimum pressure selectors and will thus transmit the lowest of their pressure inputs as their output signal pressure. Thus, in the embodiment of FIGURE 1, the first pressure selector S1 will select the lowest individual branch pressure between the thermostats T1 and T2 and will transmit this as an input to the second pressure selector S2 via the signal line 46. Likewise, the second pressure selector S2 will select the lowest pressure between the output signal of the first selector S1 and the branch pressure of the third thermostat T3.

Therefore, the signal pressure transmitted from the second pressure selector S2 to the automatic controller R via the signal pressure line 50 comprises the minimum signal pressure (maximum heat demand) of all of the thermostats in the control zone comprised of the rooms or spaces I, II and III.

The set point of the entire system, as distinguished from the individual set points of the room thermostats T1, T2 and T3 is now set at the minimum acceptable pressure (maximum acceptable heat demand) under which it is desired that the system be constrained to operate. Referring to FIGURE 3, this is accomlished via the set point selector knob 108 which is adjusted until the reading on the set point gauge G2 corresponds to the desired value, this value being maintained by the regulator valve 104 which prevents the pressure in the set point chamber from exceeding the minimum value selected by bleeding excess pressure to atmosphere via the vent 106 and pressure port 102.

The relative dimensions of the spacer washers 72 on the valve spindle 70 and the cut out portions of the pressure plates 62, 64 and 66 are such that the net reaction forces of the pressures in the various pressure chambers of the controller R, with respect to the spindle 70 as shown, are as follows:

(1) branch pressure chamber B1, upward;
(2) stabilizing pressure chamber B2, downward;
(3) set point pressure chamber S2, upward; and
(4) signal pressure chamber S1, downward.

Thus, the branch and stabilizing pressures are opposed in the controller R as are the signal and set point pressures in their relative effects on the modulated position of the valve spindle 70.

As a final assumption, it will be assumed that main air pressure is being supplied to both the room thermostats and the automatic controller R, such as shown in the simplified schematic of FIGURE 2, and that the temperature of the heating medium in the boiler of FIGURE 1 is maintained at a preselected maximum temperature by a suitable heating means such as is well known in the art.

With the room thermostats energized, the minimum signal pressure representing the maximum heat demand in any of the rooms I, II or III of the control zone will be transmitted through the signal pressure line 50 and pressure port 96 into the signal pressure chamber S1 of the automatic controller R.

Figure 3:
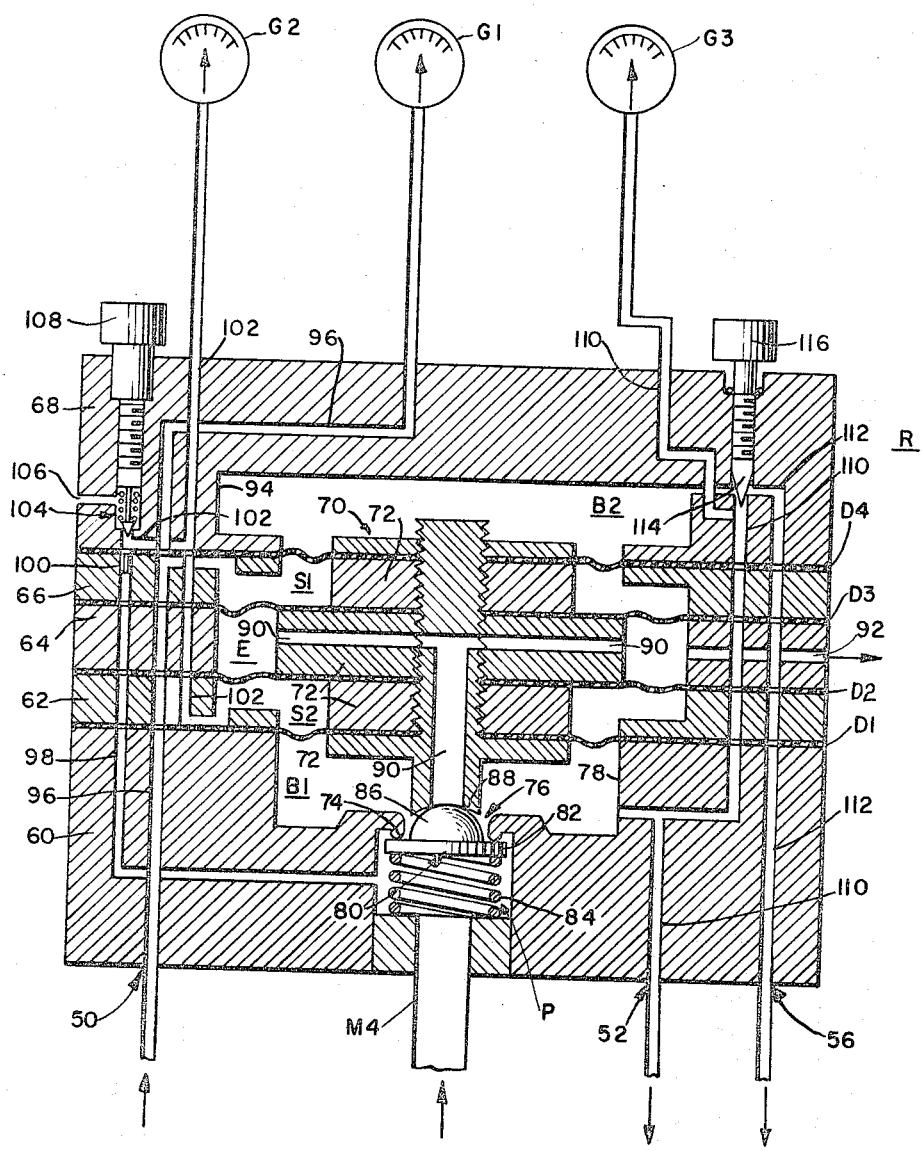
FIGURE 3 is a detailed schematic cross-section of an automatic controller used in the systems of FIGURES 1 and 2.

Considering the case in which the system is balanced prior to the transmission of a change in signal pressure to the chamber S1, the relay poppet 80 is initially seated against both the first valve seat 74 and the exhaust valve seat 88, the branch pressure is initially equal to the stabilizing pressure, and the signal pressure is initially equal to the set point pressure, and further assuming that the signal pressure in the chamber S1 is greater than the set point pressure in the chamber S2, the net reaction will force the valve spindle 70 downward (as shown in FIGURE 3).

As a result, the first head portion 82 of the relay poppet 80 will unseat from the first valve seat 74 and main air pressure from the main pressure chamber P will be admitted to the branch pressure chamber B1, causing the branch pressure to increase. This increase will continue until the differential between the signal pressure and the set point pressure has been nullified and the relay poppet 80 allowed to reseat on the first valve seat 74.

Simultaneously, however, with the increase in the branch pressure in the chamber B1, there is a stabilizing pressure increase commencing in the stabilizing pressure chamber B2 and the accumulator tank 58 occasioned by flow from the chamber B1 through the port 110, needle valve 114 and port 112.

The needle valve 114 causes the stabilizing pressure in the chamber B2 to follow the branch pressure change in the chamber B1 with a response delay effected by the setting of the said needle valve 114 and thus, gradually and increasingly oppose the reaction force of the branch pressure in chamber B1 through the valve spindle 70.

Thus, there will continue to be a condition of unbalance between the reaction forces of the pressures in the various chambers S1, S2, B1 and B2 and the relay poppet 80 will continue to be unseated from the first valve seat 74, thus continuing to admit main air pressure from the main pressure chamber P into the branch pressure chamber B1.

Since an increase in signal pressure has already been defined hereinbefore as a reduced demand for heat from the maximum demand area of the control zone, the above increase in branch pressure causes the valve actuator 54 to constrain the main control valve V4 to reduce the draw from the boiler and effect a lower discharge temperature of the main heat exchange medium being circulated in the lines 16 and 18.

Thus, after the reduced demand for heat is satisfied (lowered) the signal pressure in the signal pressure chamber S1 will begin to decrease tending to rebalance the automatic controller. At the same time, the pressure in the stabilizing pressure chamber B2 is varying in the same manner as the branch pressure in the chamber B1 and is adding to the reaction of the change in signal pressure in the chamber S1. This further tends to bring the relay poppet 80 of the automatic controller R to a condition of balance.

Referring now to FIGURE 2 for the sake of simplicity, the reason for maintaining the dynamic condition of the pressures and reaction forces in the automatic controller R will be explained.

For example, consider the case in which the heat exchange medium with lower discharge temperature requires a fifteen (15) minute time interval to reach the room or space, being monitored by the thermostat T5, from the main control valve V4 and then, a half hour may be required for the room or space to cool and fully satisfy the demand of the thermostat T5. Without a response delay in the automatic controller R as provided by the stabilizing pressure chamber B2 and the accumulator tank 58, the unsatisfied demand of the thermostat T5 over a long period of time, such as the half hour of the present example, would result in a continued modulation of the main control valve V4 to effect circulation in the system of heat exchange medium reduced to minimum temperature.

Thus, the room or space monitored by the thermostat T5 would become too cold for the set point of the thermostat T5 and the latter would produce a signal pressure imposing an increased heat demand on the system.

Because of the fifteen (15) minute circulation delay, the response of the automatic controller R and the main V4 to the demand of thermostat T5 will be to effect ultimate circulation of heat exchange medium at maximum temperature, causing the room or space monitored by the thermostat T5 to overheat.

Thus, without the presence of response delay in the automatic controller R, the system will continue to cycle the discharge temperature of the heat exchange medium between the maximum and minimum values thereof and, as such, is highly unstable.

Referring additionally to FIGURE 3, it can readily be seen that a prolonged increase, for example, of the signal pressure in the chamber S1 will continue to force the valve spindle 70 downward and cause the lower valve head 82 of the relay poppet 80 to remain unseated from the first valve seat 74. This results in a continued increase in the branch pressure in the chamber B1 until such time as the branch pressure is the same value as the pressure in the main pressure chamber P, which constrains the main valve V4 to decrease the temperature of the heat exchange medium to the maximum value thereof.

However, if the demand of the thermostat T5 increases due to the above-defined time lag in the circulation of the heat exchange medium, resulting in a decrease of the signal pressure in the chamber S1, the stabilizing pressure in the stabilizing chamber B2 will be increasing at the same time, algebraically modulating the reaction force in the valve spindle 70 to partially compensate for the change in the said reaction force developed by the time varying signal pressure in the signal pressure chamber S1.

Since the branch pressure in the chamber B1 is already at its maximum value and greater than the stabilizing pressure in the chamber B2, the net reaction force on the valve spindle 70 is upward, causing the relay poppet 80 to close off the supply of pressure from the main pressure chamber and unseat from the floating exhaust seat 88, venting the branch pressure chamber B1 to atmosphere via the exhaust port 90, exhaust chamber E and exhaust vent 92.

The branch pressure in the chamber B1 will thus begin to decrease while the stabilizing pressure in the chamber B2 will still be increasing at a rate controlled by the setting of the needle valve 114, tending to reseat the valve head 86 of the relay poppet 80 on the floating exhaust seat 88.

Therefore, rather than permitting the branch pressure to be modulated from one extreme to the other in response to a change in the signal pressure received from the thermostat T5, the modulation is restrained by the action in the stabilizing chamber B2 to take place at a rate compatible with the entire environmental control system to optimize the changes imposed upon the discharge temperature of the heating medium such that full pressure and resulting temperature swings within the operating limits of the system are damped out and stability is achieved.

Simultaneously with the achievement of stability of the system as described in connection with FIGURES 2 and 3, when the same control action is combined with the system of FIGURE 1, the temperature of the heat exchange medium is modulated to achieve an optimum temperature for the control zone being monitored as previously described herein.

Once the system of the present invention is in operation and stabilized by the interaction of pressures defined above, changes of signal pressure in the signal pressure chamber S1 in either direction from a null (balanced) condition of the relay poppet 80, will effect a control action in the automatic controller R which is constrained to a rate of change that has been optimized to the particular time delay characteristics of the specific environmental control system involved, this rate having been preselected by the setting of the stabilizer needle valve 114.

As can be readily seen from the foregoing specification and drawings, this invention satisfies a long felt need in the art for a stable, automatic, environmental control system which optimizes the discharge temperature of the main heat exchange medium therein as a direct function of the heat load (demand) in the control zone. This results in optimum efficiency of operation with attendant savings in fuel and other operating costs.

While this invention has been specifically illustrated in connection with a hot water heating system, the environmental control systems broadly disclosed encompass air conditioning (cooling) systems as well as other similar systems which automatically constrain environmental variables as a function of preselected parametric conditions; and therefore, the specific embodiments shown and described herein are for the purpose of example only and are not intended to limit the scope of the appended claims.

What is claimed is:

1. In an environmental temperature control system for a control zone having a plurality of spaces therein, said system including a like plurality of thermostat means each controlling the temperature of respective ones of said spaces and each generating a control signal as a function of the heat exchange demand of a respectively associated space, a source of heat exchange medium, circulating means conveying said heat exchange medium from said source to said spaces, and modulating means, including an input, controlling the discharge temperature of said heat exchange medium from said source into said circulating means, the combination of selector means, having a plurality of inputs adapted to receive said control signals from said thermostats and a single output, selectively transmitting from said output that control signal from said thermostats representing the maximum heat exchange demand from said spaces in said control zone, and automatic controller means, having an input and an output connected at its input to the output of said selector means and at its output to the input of said discharge temperature modulating means, actuating said modulating means to control said discharge temperature of said heat exchange medium as a direct function of the maximum heat exchange demand of said control zone.

2. The invention defined in claim 1, said system having an inherent time delay in conveying said heat exchange medium from said source to said spaces, wherein said automatic controller includes selectively variable response delay means compatibly adapting said automatic controller with said inherent time delay in said system.

3. In an environmental temperature control system for a control zone having a plurality of spaces therein, said system including a like plurality of thermostat means each controlling the temperature of respective ones of said spaces and each generating a control signal as a function of the heat exchange demand of a respectively associated space, a source of heat exchange medium, circulating means conveying said heat exchange medium from said source to said spaces, and modulating means, including an input, controlling the discharge temperature of said heat exchange medium from said source into said circulating means, the combination of selector means, having a plurality of inputs adapted to receive said control signals from said thermostats and a single output selectively transmitting from said output that control signal from said thermostats representing the maximum heat exchange demand from said spaces in said control zone, and automatic controller means, having an input and an output connected at its input to the output of said selector means and at its output to the input of said discharge temperature modulating means, actuating said modulating means to control said discharge temperature of said heat exchange medium as a direct function of the maximum heat exchange demand of said control zone; wherein said control signals comprise pneumatic pressure variations; and further wherein said automatic controller is adapted to be connected with a source of supply pressure and comprises a branch pressure chamber, a setpoint pressure chamber, a signal pressure chamber and a stabilizing pressure chamber, each of said chambers including a movable wall portion displaceable, respectively, in response to pressure variations in said chambers, a relay valve selectively interconnecting said branch pressure chamber with said source of supply pressure and with atmosphere, having valve actuator means mutually interconnected with said movable wall portions, first means maintaining a constant preselected pressure in said setpoint chamber, second means communicating said input of said automatic controller to said signal pressure chamber, pressure accumulator means, and selectively variable flow means interconnecting said branch pressure chamber with said accumulator means and with said stabilizing pressure chamber.

4. In an environmental parameter control system for a control zone having a plurality of spaces therein, said system including a like plurality of monitoring means each controlling an environmental parameter of respective ones of said spaces and each generating a control demand signal as a function of the condition of the environmental parameter being monitored thereby in a respectively associated space, a source of control medium, said control medium being adapted to modulate said environmental parameter, circulating means conveying said control medium from said source to said spaces, and modulating means, including an input, controlling the capability of said control medium to modulate said environmental parameter when the latter is discharged from said source into said circulating means, the combination of selector means, having a plurality of inputs adapted to receive said control signals from said monitoring means and a single output, selectively transmitting from said output that control signal representing the maximum control demand from said spaces in said control zone, and automatic controller means, having an input and an output connected at its input to the output of said selector means and at its output to the input of said modulating means, actuating said modulating means to control said capability of said control medium as a direct function of the maximum control demand of said control zone.

5. The invention defined in claim 4, said system having an inherent time delay in conveying said control medium from said source to said spaces, wherein said automatic controller includes selectively variable response delay means compatibly adapting said automatic controller with said inherent time delay in said system.

6. In an environmental pneumatic control system, an automatic controller adapted to be connected with a source of supply pressure and a source of signal pressure comprising a branch pressure chamber, a setpoint pressure chamber, a signal pressure chamber and a stabilizing pressure chamber, each of said chambers including a movable wall portion displaceable, respectively, in response to pressure variations in said chambers, a relay valve, selectively interconnecting said branch pressure chamber with said source of supply pressure and with atmosphere, having valve actuator means mutually interconnected with said movable wall portions, first means maintaining a constant preselected pressure in said setpoint chamber, second means communicating said input of said automatic controller to said signal pressure chamber, pressure accumulator means, and selectively variable flow means interconnecting said branch pressure chamber with said accumulator means and with said stabilizing pressure chamber.

7. In an environmental control system including an automatic controller adapted to be connected with a source of supply pressure and a source of signal pressure, said controller including a signal pressure chamber, a setpoint pressure chamber and a branch pressure chamber, each of said chambers including movable wall portions displaceable, respectively, in response to pressure variations in said chambers, and relay valve means mutually interconnected with said wall portions and selectively communicating said branch pressure chamber with said source of supply pressure and with atmosphere; means effecting a response delay of said relay valve means in response to changes in said signal pressure comprising a stabilizing pressure chamber having a movable wall portion acting in opposition to the movable wall portion of said branch pressure chamber and additive relationship with the movable wall portion of said signal pressure chamber, pressure accumulator means, and selectively variable flow means mutually intercommunicating said branch pressure chamber with said stabilizing pressure chamber and said pressure accumulator means.

8. The invention defined in claim 3, wherein the movable wall portion of said stabilizing pressure chamber acts in opposition to the movable wall portion of said branch pressure chamber and additive relationship with the movable wall portion of said signal pressure chamber effecting a response delay of said relay valve in response to changes in signal pressure.

References Cited
UNITED STATES PATENTS

| | | | |
|---|---|---|---|
| 2,047,234 | 7/1936 | Smith | 236—74 |
| 2,188,775 | 1/1940 | Locke | 236—1 |
| 2,234,633 | 3/1941 | Hoppe | 236—1 |
| 2,705,017 | 3/1955 | Lewis | 137—86 |
| 2,935,077 | 3/1960 | Keyser | 137—82 |

EDWARD J. MICHAEL, *Primary Examiner.*

Dedication 3,338,519.—*Kenneth G. Kreuter*, Goshen, and *James W. Phillips*, South Bend, Ind. ZONE LOAD RESPONSIVE OPTIMIZING CONTROL SYSTEM. Patent dated Aug. 29, 1967. Dedication filed Mar. 18, 1976, by the assignee, *Robertshaw Controls Company*.

Hereby dedicates to the Public the remaining term of said patent.

[*Official Gazette May 25, 1976.*]